United States Patent
Chuang et al.

(10) Patent No.: US 9,832,373 B2
(45) Date of Patent: Nov. 28, 2017

(54) SYSTEMS AND METHODS FOR AUTOMATICALLY CAPTURING DIGITAL IMAGES BASED ON ADAPTIVE IMAGE-CAPTURING TEMPLATES

(71) Applicant: CyberLink Corp., Shindian, Taipei (TW)

(72) Inventors: Yu-Tung Chuang, Pingjhen (TW); Jyun-Kai Syong, New Taipei (TW); Ermin Lin, Yilan County (TW)

(73) Assignee: CYBERLINK CORP., Shindian, Taipei (TW)

(*) Notice: Subject to any disclaimer, the term of this patent is extended or adjusted under 35 U.S.C. 154(b) by 0 days.

(21) Appl. No.: 14/611,342

(22) Filed: Feb. 2, 2015

(65) Prior Publication Data

US 2015/0373258 A1 Dec. 24, 2015

Related U.S. Application Data

(60) Provisional application No. 62/016,226, filed on Jun. 24, 2014.

(51) Int. Cl.
| | |
|---|---|
| *H04N 5/232* | (2006.01) |
| *G06K 9/00* | (2006.01) |
| *H04N 5/91* | (2006.01) |
| *H04N 5/77* | (2006.01) |
| *G06K 9/62* | (2006.01) |

(52) U.S. Cl.
CPC ..... *H04N 5/23222* (2013.01); *G06K 9/00362* (2013.01); *G06K 9/6203* (2013.01); *H04N 5/772* (2013.01); *H04N 5/91* (2013.01)

(58) Field of Classification Search
CPC .... H04N 1/2112; H04N 5/76; H04N 2101/00; H04N 2201/214; G06T 1/20
See application file for complete search history.

(56) References Cited

U.S. PATENT DOCUMENTS

| | | | |
|---|---|---|---|
| 7,084,900 B1 | 8/2006 | Watanabe et al. | |
| 7,787,762 B2 | 8/2010 | Abe | |
| 8,045,013 B2 | 10/2011 | Abe | |
| 2008/0094472 A1 | 4/2008 | Ayer et al. | |

(Continued)

OTHER PUBLICATIONS

Prest et al. "Learning Object Class Detectors from Weakly Annotated Video" Computer Vision and Pattern Recognition. May 10, 2012.

(Continued)

*Primary Examiner* — Twyler Haskins
*Assistant Examiner* — Carramah J Quiett
(74) *Attorney, Agent, or Firm* — McClure, Qualey & Rodack, LLP

(57) ABSTRACT

A digital recording device is configured to automatically capture digital images. In the digital recording device, a camera module operating in a live preview mode generates a video stream comprising digital images. A content analyzer generates a trigger signal based on an initial image-capturing template. The camera module captures and stores digital images responsive to receiving the trigger signal. A user interface component receives from a user one or more selections among the stored digital images, a template adjuster adjusts at least one target pose specified by the image-capturing template based on the one or more user selections, wherein the content analyzer generates the trigger signal based on the adjusted image-capturing template.

23 Claims, 15 Drawing Sheets

(56) References Cited

U.S. PATENT DOCUMENTS

| | | |
|---|---|---|
| 2008/0137956 A1 | 6/2008 | Yang et al. |
| 2008/0317357 A1 | 12/2008 | Steinberg et al. |
| 2009/0015702 A1 | 1/2009 | Garcia Alonso |
| 2010/0171846 A1 | 7/2010 | Wood et al. |
| 2012/0114175 A1 | 5/2012 | Hwang et al. |
| 2012/0169880 A1 | 7/2012 | Williamson |

OTHER PUBLICATIONS

Hirao et al. "Pose Estimation of Human Upper Body Using Multi-joint CG Model and Stereo Video Images" ICAT, 2004.

FIG. 11

SYSTEMS AND METHODS FOR AUTOMATICALLY CAPTURING DIGITAL IMAGES BASED ON ADAPTIVE IMAGE-CAPTURING TEMPLATES

CROSS-REFERENCE TO RELATED APPLICATION

This application claims priority to, and the benefit of, U.S. Provisional Patent Application entitled, "Systems and Methods for Capturing Digital Images Based on Adaptive Image-Capturing Templates," having Ser. No. 62/016,226, filed on Jun. 24, 2014, which is incorporated by reference in its entirety.

TECHNICAL FIELD

The present disclosure generally relates to capturing digital images and more particularly, to a system and method for automatically capturing digital images using adaptive image-capturing templates.

BACKGROUND

With the ever-growing amount of digital content available to consumers through the Internet and other sources, consumers have access to a vast amount of content. As smartphones and other mobile devices have become ubiquitous, people have the ability to take pictures virtually any time. However, it can still be a challenge to capture the perfect shot.

SUMMARY

Briefly described, one embodiment, among others, is a digital recording system for automatically capturing digital images that comprises a camera module operating in a live preview mode for generating a video stream comprising digital images, a processor, and an application executable in the processor. The application comprises a content analyzer for generating a trigger signal based on an initial image-capturing template, wherein the camera module captures and stores digital images responsive to receiving the trigger signal. The application further comprises a user interface component for receiving from a user one or more selections among the stored digital images, and a template adjuster for adjusting at least one target pose specified by the image-capturing template based on the one or more user selections, wherein the content analyzer generates the trigger signal based on the adjusted image-capturing template.

Another embodiment is a method implemented in a digital recording device for automatically capturing digital images. The method comprises generating, by a camera module operating in a live preview mode, a video stream comprising digital images and generating, by a content analyzer, a trigger signal based on an initial image-capturing template. The method further comprises capturing and storing, by the camera module, digital images responsive to receiving the trigger signal and receiving, by a user interface component, from a user one or more selections among the stored digital images. A template adjuster adjusts at least one target pose specified by the image-capturing template based on the one or more user selections, wherein the content analyzer generates the trigger signal based on the adjusted image-capturing template.

Another embodiment is a cloud-based image processing system coupled to a digital recording device configured to automatically capture digital images. The system comprises a device interface coupled to a camera module of the digital recording device, the device interface receiving digital images in a video stream generated by the camera module, at least one processor, and an application executable in the at least one processor. The application comprises a content analyzer for generating a trigger signal based on an initial image-capturing template, wherein the content analyzer transmits the trigger signal to the camera module in the digital recording device via the device interface, wherein the camera module in the digital recording device captures and stores digital images in the cloud-based image processing device responsive to receiving the trigger signal. The application further comprises a user interface component for receiving from a user one or more selections among the stored digital images and a template adjuster for adjusting at least one target pose specified by the image-capturing template based on the one or more user selections, wherein the content analyzer generates the trigger signal based on the adjusted image-capturing template.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 11 illustrates the use of graphical control components for purposes of determining the user's reason for deleting the undesired images according to various embodiments of the present disclosure.

DETAILED DESCRIPTION

Various embodiments are disclosed for automatically capturing digital images via a digital recording device based on target actions or poses depicted in the images. Specifically, template-based capturing techniques are disclosed whereby image-capturing templates are dynamically adjusted on-the-fly based on one or more desirable actions or poses by the subject and based on user input. For purposes of this disclosure, image-capturing templates are utilized by embodiments of the digital recording device disclosed herein for automatically capturing candidate digital photos for presentation to the user, thereby allowing the user to efficiently capture images of desired poses.

Figure 5A:
FIG. 5A illustrates an example of target actions or poses specified in an image-capturing template according to various embodiments of the present disclosure.
Figure 5B:
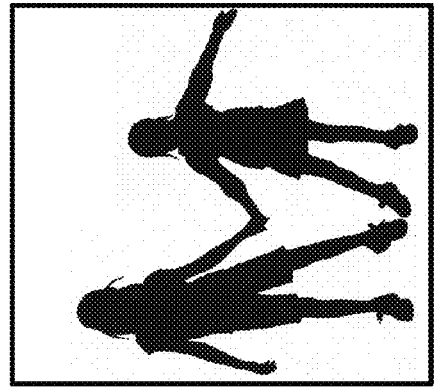
FIG. 5B illustrates an example of a target action or pose by multiple individuals specified in an image-capturing template according to various embodiments of the present disclosure.

Image-capturing templates may be stored in any number of electronic file formats and may contain one or more definitions of target poses, where the definitions may be embodied as representative digital photos depicting the desired pose, a graphical depiction of a desired pose (e.g., an outline or gesture of an individual or a group of people), image-capturing windows, and so on. For example, FIG. 5B illustrates an example of a target action or pose by multiple individuals specified in an image-capturing template, where the target action/pose is represented by the graphical depiction shown.

Figure 1:
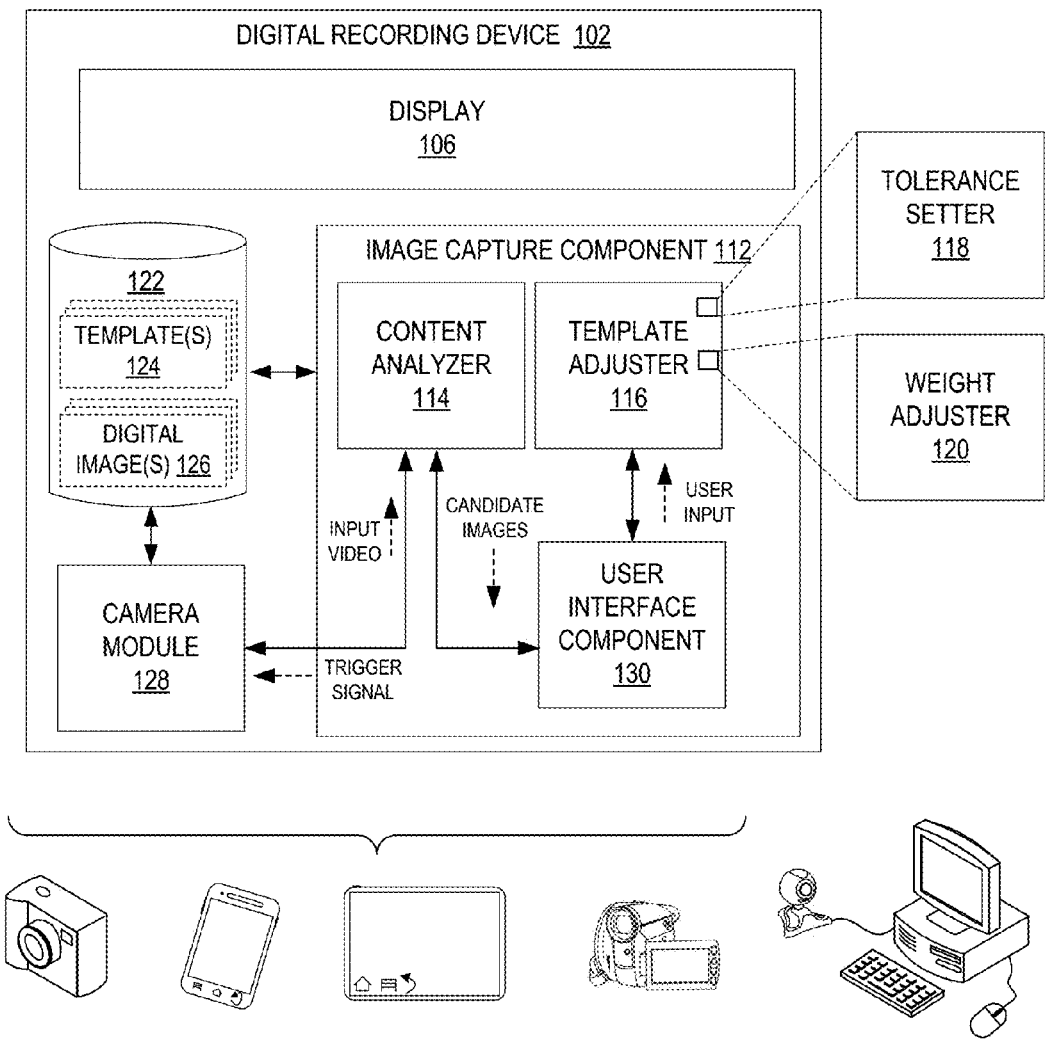
FIG. 1 is a block diagram of a digital recording device for automatically capturing digital images in accordance with various embodiments of the present disclosure.

A description of a digital recording device for capturing digital images is now described followed by a discussion of the operation of the components within the system. FIG. 1 is a block diagram of a digital recording device 102 in which the image-capturing techniques disclosed herein may be implemented. The digital recording device 102 may be embodied as a computing device equipped with digital content recording capabilities such as, but not limited to, a digital camera, a smartphone, a tablet computing device, a digital video recorder, a laptop computer coupled to a webcam, and so on.

For various embodiments, an action learning process is performed whereby a user defines an initial image-capturing template and specifies one or more desirable actions/poses via a user interface generated by the user interface component 130 in the digital recording device 102. For some embodiments, the user may define one or more initial image-capturing templates 124 by selecting digital images from a group of previously-captured images stored in a data store 122 of the digital recording device 102, where the selected digital images depict one or more desired target poses. The user may alternatively specify a target pose by editing a graphical depiction of an individual comprising, for example, an outline of an individual, where the outline depicts the target pose.

The digital recording device 102 includes a camera module 128, which includes an image sensor, a lens assembly, and so on where operational settings of the camera module 128 are configurable to accommodate the user's shooting preferences. The camera module 128 may further comprise an LCD display configured to operate in a live preview mode to assist the user in capturing images. In particular, when operating in live preview mode, the camera module 128 generates an input video that shows the scene from the same viewpoint as the lens assembly of the camera module 128 and provides the user with a means of previewing a scene before capturing and storing a digital image. Furthermore, the live preview mode of the camera module 128 represents an approximation of how a scene will look under the operational settings (e.g., exposure level, white balance) specified by the user. The camera module 128 is further configured to capture and store digital images in response to receiving a trigger signal, as described in more detail below.

An image capture component 112 executes on a processor of the digital recording device 102 and includes a content analyzer 114 and a template adjuster 116. The content analyzer 114 is configured to analyze an input video received form the camera module 128 of the digital recording device 102 and utilize image-capturing templates to send trigger signals to the camera module 128. The desired actions or poses depicted in the selected digital images may be grouped and multiple image-capturing templates may be specified by the user. For example, the user may group actions/poses according to user preference where the most desirable actions/poses are grouped together to form a first template. For some embodiments, the user may specify that only a first template corresponding to the most desirable actions/poses be activated for purposes of capturing digital images. The content analyzer 114 applies the image-capturing template(s) 124 and monitors the input video while the camera module 128 is operating in a live preview mode.

The input video may be encoded in such formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

In response to receiving trigger signals, the camera module 128 captures and stores candidate digital images 126 in the data store 122 of the digital recording device 102. Candidate digital images 126 represent digital images that are automatically captured and stored by the camera module 128 and that are presented to the user so that the user can delete any undesired images. As one of ordinary skill will appreciate, the candidate images 126 in the data store 122 may be encoded in various formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files, and so on.

The candidate digital images 126 are forwarded to a user interface component 130, which is configured to generate a user interface that allows a user to select one or more of the candidate images 126. For some embodiments, the one or more selections correspond to candidate images 126 that the user wishes to delete. The user interface component 130 forwards the user input comprising the one or more selections to the template adjuster 116, which is configured to adjust the image-capturing template on-the-fly based on which automatically-captured digital images the user keeps and/or deletes. In this regard, the image capture component 112 utilizes user feedback to adaptively learn the user's preferences in capturing digital images and adjust the image-capturing template accordingly.

The template adjuster 116 further comprises a tolerance setter 118 configured to adjust a tolerance level that the content analyzer utilizes for identifying images that meet the requirements specified in the template. A weight adjuster 120 in the template adjuster 116 is configured to assign weights to the various requirements or parameters specified in the image-capturing template. The operation of the template adjuster 116 and the weight adjuster 120 is described in more detail later.

Figure 2:
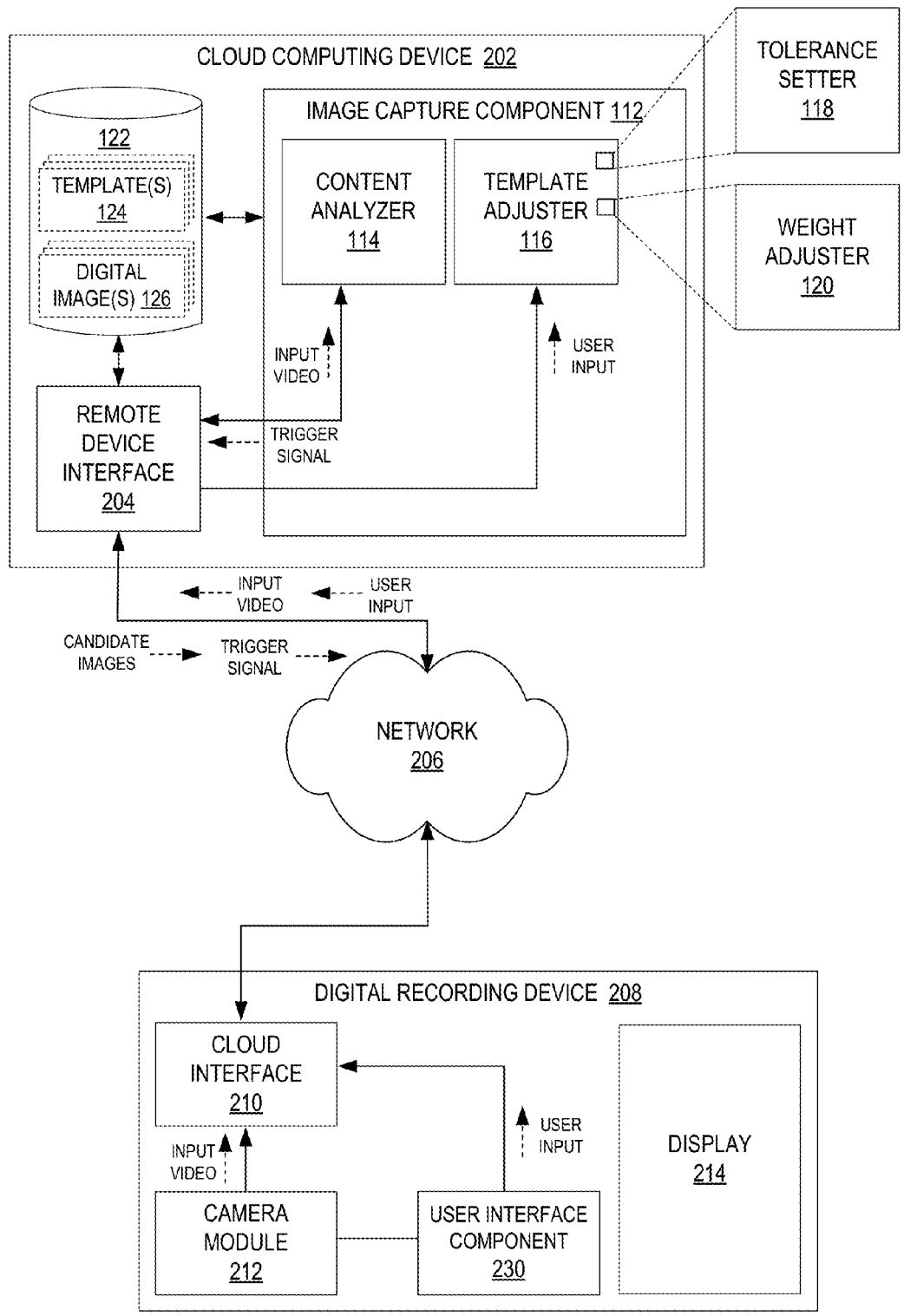
FIG. 2 illustrates an alternative embodiment for automatically capturing digital images in a networked environment where a digital recording device interfaces with a cloud computing device in accordance with various embodiments of the present disclosure.

FIG. 2 illustrates an alternative embodiment for automatically capturing digital images in a networked environment where a digital recording device 208 interfaces with a cloud computing device 202. In the networked environment shown, the dynamic adjustment of image-capturing templates 124 and other functions such as content analysis are performed remotely by the cloud computing device 202.

The cloud computing device 202 may be communicatively coupled to the digital recording device 208 via a network 206 comprising, for example, the Internet, intranets, extranets, wide area networks (WANs), local area networks (LANs), wired networks, wireless networks, or other suitable networks, etc., or any combination of two or more such networks. Through the network 206, the cloud computing device 202 may receive digital media content from the digital recording device 208.

As shown, the cloud computing device 202 includes various components, including the content analyzer 114, and the template adjuster 116, described above in connection with FIG. 1. The cloud computing device 202 further comprises a remote device interface 204 for allowing the cloud computing device 202 to be communicatively coupled to a remote digital recording device 208. The digital recording device 208 transmits an input video to the cloud computing device 202 via a cloud interface 210.

Rather than analyzing the content locally on the digital recording device 208, the content analyzer 114 in the cloud computing device 202 processes the input video to determine whether a target pose specified by the image-capturing template 124 is depicted in the input video. In response to determining that a target pose is being depicted in the input video, the content analyzer 114 in the cloud computing device 202 transmits a trigger signal to the digital recording device 208 via the remote device interface 204. In response to receiving the trigger signal, the digital recording device 208 captures and stores a candidate image 126 depicting the target pose. The captured candidate image 126 may either be stored locally in the digital recording device 208 or stored remotely in a data store 122 of the cloud computing device 202.

The candidate digital images 126 are forwarded to a user interface component 230 in the digital recording device 208, which generates a user interface that allows a user to select one or more of the candidate images. In the embodiment shown in FIG. 2, the user interface is shown on a display 214 of the digital recording device 208. As discussed above, the one or more selections correspond to candidate images 126 that the user wishes to delete. The user interface component 230 forwards the user input comprising the one or more selections to the template adjuster 116 in the cloud computing device 202, which is configured to adjust the image-capturing template on-the-fly based on which automatically-captured digital images the user keeps and/or deletes. As discussed above in connection with FIG. 1, the template adjuster 116 further comprises a tolerance setter 118 configured to adjust a tolerance level that the content analyzer utilizes for identifying images that meet the requirements specified in the template. A weight adjuster 120 in the template adjuster 116 is configured to assign weights to the various requirements or parameters specified in the image-capturing template.

Based on the image-capturing template(s), the image capture component 112 executing in the digital recording device 102 communicates with the camera module 128 to capture images by making an educated guess regarding which digital images the user may find desirable. The captured digital images are then stored and presented to the user. Based on which digital images the user subsequently keeps and/or deletes, the image-capturing template 124 is adjusted on-the-fly to further refine the automatic image capture mode of the digital recording device 102 in an effort to reduce the number of undesirable images that the user deletes.

Figure 3:
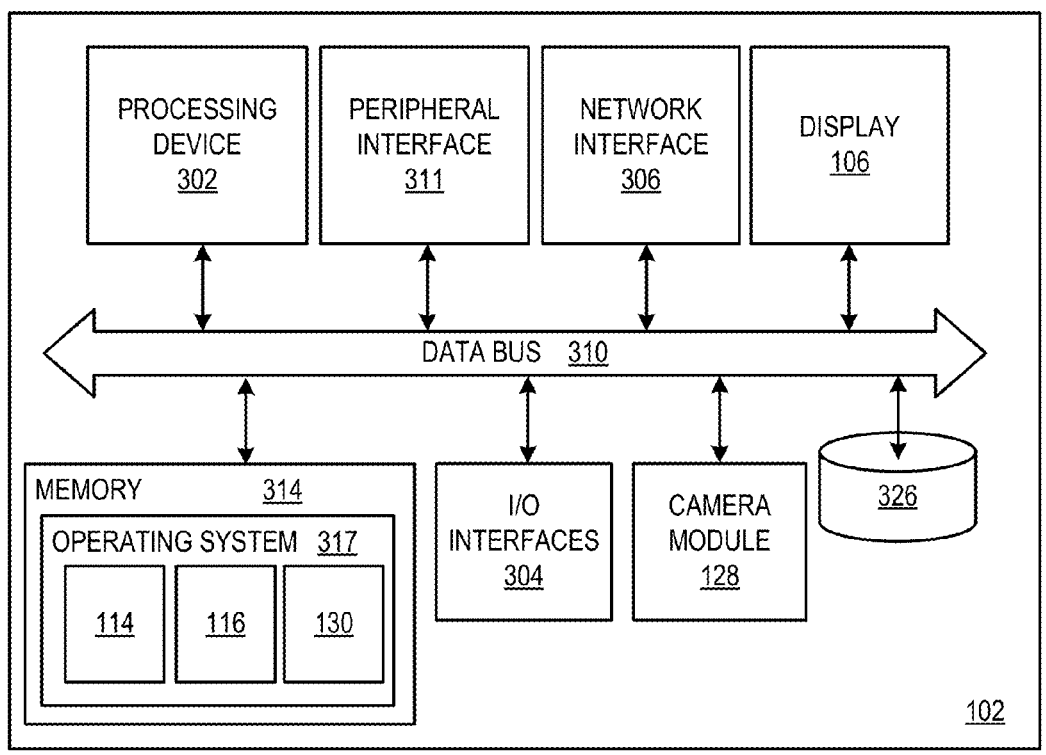
FIG. 3 is a schematic diagram of the digital recording device of FIG. 1 in accordance with various embodiments of the present disclosure.

FIG. 3 is a schematic diagram of the digital recording device 102 shown in FIG. 1. The digital recording device 102 may be embodied in any one of a wide variety of wired and/or wireless computing devices, such as a desktop computer, portable computer, dedicated server computer, multi-processor computing device, smartphone 109, tablet computing device, and so forth. As shown in FIG. 3, the digital recording device 102 comprises memory 314, a processing device 302, a number of input/output interfaces 304, a network interface 306, a display 106, a peripheral interface 311, and mass storage 326, wherein each of these devices are connected across a local data bus 310.

The processing device 302 may include any custom made or commercially available processor, a central processing unit (CPU) or an auxiliary processor among several processors associated with the digital recording device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 314 can include any one of a combination of volatile memory elements (e.g., random-access memory (RAM, such as DRAM, and SRAM, etc.)) and nonvolatile memory elements (e.g., ROM, hard drive, CDROM, etc.). The memory 314 typically comprises a native operating system 317, one or more native applications, emulation systems, or emulated applications for any of a variety of operating systems and/or emulated hardware platforms, emulated operating systems, etc.

The applications may include application specific software which may comprise some or all the components (content analyzer 114, template adjuster 116, user interface component 130) of the digital recording device 102 depicted in FIG. 1. In accordance with such embodiments, the components are stored in memory 314 and executed by the processing device 302. One of ordinary skill in the art will appreciate that the memory 314 can, and typically will, comprise other components which have been omitted for purposes of brevity.

In this regard, the term "executable" may refer to a program file that is in a form that can ultimately be run by the processing device 302. Examples of executable programs may be, for example, a compiled program that can be translated into machine code in a format that can be loaded into a random access portion of the memory 314 and run by the processing device 302, source code that may be expressed in proper format such as object code that is capable of being loaded into a random access portion of the memory 314 and executed by the processing device 302, or source code that may be interpreted by another executable program to generate instructions in a random access portion of the memory 314 to be executed by the processing device 302, etc. An executable program may be stored in any portion or component of the memory 314 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. Input/output interfaces 304 provide any number of interfaces for the input and output of data.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 3, network interface 306 comprises various components used to transmit and/or receive data over a network environment. The digital recording device 102 may communicate with one or more computing devices via the network interface 306 over the network 206 (FIG. 2). The digital recording device 102 may further comprise mass storage 326. The peripheral interface 311 supports various interfaces including, but not limited to IEEE-1394 High Performance Serial Bus (Firewire), USB, a serial connection, and a parallel connection.

Figure 4:
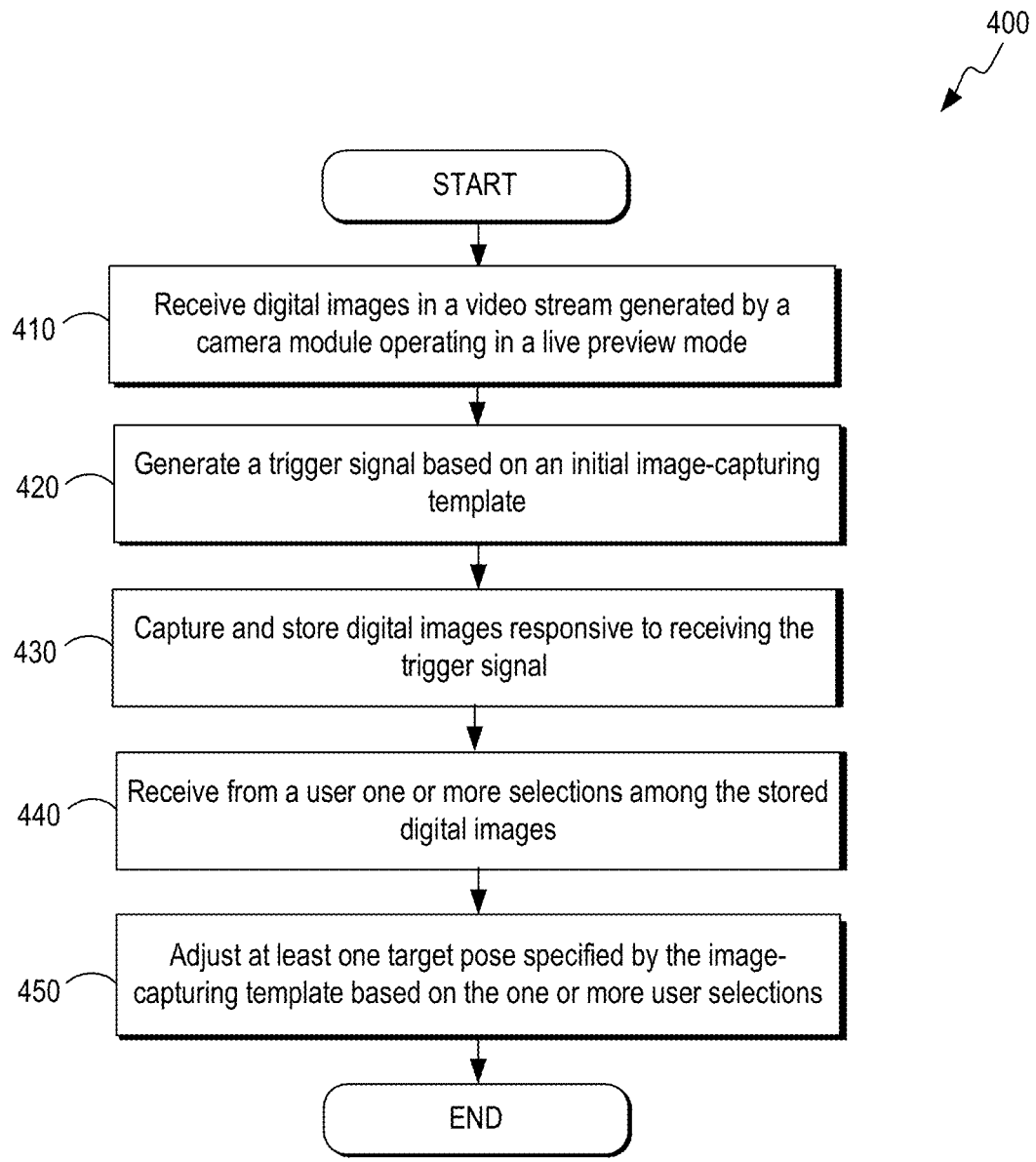
FIG. 4 is a top-level flowchart illustrating examples of functionality implemented as portions of the digital recording device of FIG. 1 for automatically capturing images according to various embodiments of the present disclosure.

Reference is made to FIG. 4, which is a flowchart 400 in accordance with one embodiment for capturing digital images performed by the digital recording device 102 of FIG. 1. It is understood that the flowchart 400 of FIG. 4 provides merely an example of the many different types of functional arrangements that may be employed to implement the operation of the various components of the digital recording device 102. As an alternative, the flowchart of FIG. 4 may be viewed as depicting an example of steps of a method implemented in the digital recording device 102 according to one or more embodiments.

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. It is understood that all such variations are within the scope of the present disclosure.

Beginning with block 410, the camera module 128 (FIG. 1) operating in a live preview mode generates a video stream comprising digital images. In block 420, the content analyzer 114 (FIG. 1) generates a trigger signal based on an initial image-capturing template. In block 430, the camera module captures and stores digital images responsive to receiving the trigger signal.

In block 440, the user interface component 130 (FIG. 1) receives from a user one or more selections among the stored digital images. In block 450, the template adjuster 116 (FIG. 1) adjusts at least one target pose specified by the image-capturing template based on the one or more user selections, where the content analyzer 114 generates the trigger signal based on the adjusted image-capturing template.

For various embodiments, the image-capturing templates specifies such information as digital recording device operational settings and characteristic values, where the operational settings may comprise, for example, a variety of device settings such as shutter speed, aperture size, focal length, white balance, ISO sensitivity, camera shooting angle, and so on. The characteristic values may comprise, for example, brightness level, contrast level, histogram data, regional sharpness, object shape analysis, and so on.

The image capture component 112 (FIG. 1) executing on the digital recording device 102 identifies digital images that share at least some common traits (e.g., operational settings applied in capturing the images and characteristic values of the images) as those specified in the image-capturing template(s) and triggers the digital recording device to capture the identified digital images.

Having described the operation of various components of the digital recording device 102, reference is made to the following figures, which further illustrate various concepts. FIG. 5A illustrates an example of target actions or poses 500 that may be specified in a given image-capturing template 124 (FIG. 1). In the example shown, variations of the same general pose are shown where the content analyzer 114 (FIG. 1) applies the image-capturing template 124 specifying the pose variations and monitors the content in the input video received from the camera module 128. The content analyzer 114 generates a trigger signal in response to at least a portion (e.g., one or more video frames) of the input video approximately matching the at least of the target poses shown in FIG. 5A.

For some embodiments, image-capturing templates may include not only representative poses defined by digital photos and/or outlines as discussed earlier, but also image-capturing windows that define a range in variation of target poses specified in image-capturing templates. As described below, image-capturing windows may be derived based on one or more previously-captured digital images that the user has elected to keep. Specifically, image-capturing windows specify a variation in a prominent feature of a target pose, thereby allowing the digital recording device 102 (FIG. 1) to capture more candidate images for the user to select from. For example, a determination may be made based on a comparison between two digital photos depicting desired poses that the main point of variation between the digital photos is the placement of the individual's arm. An image-capturing window may therefore be defined that specifies a variation in this prominent feature. Note that the image capture component 112 is not limited to analyzing the arm region and analyzes the poses individuals as a whole when identifying candidate images.

Figure 6A:
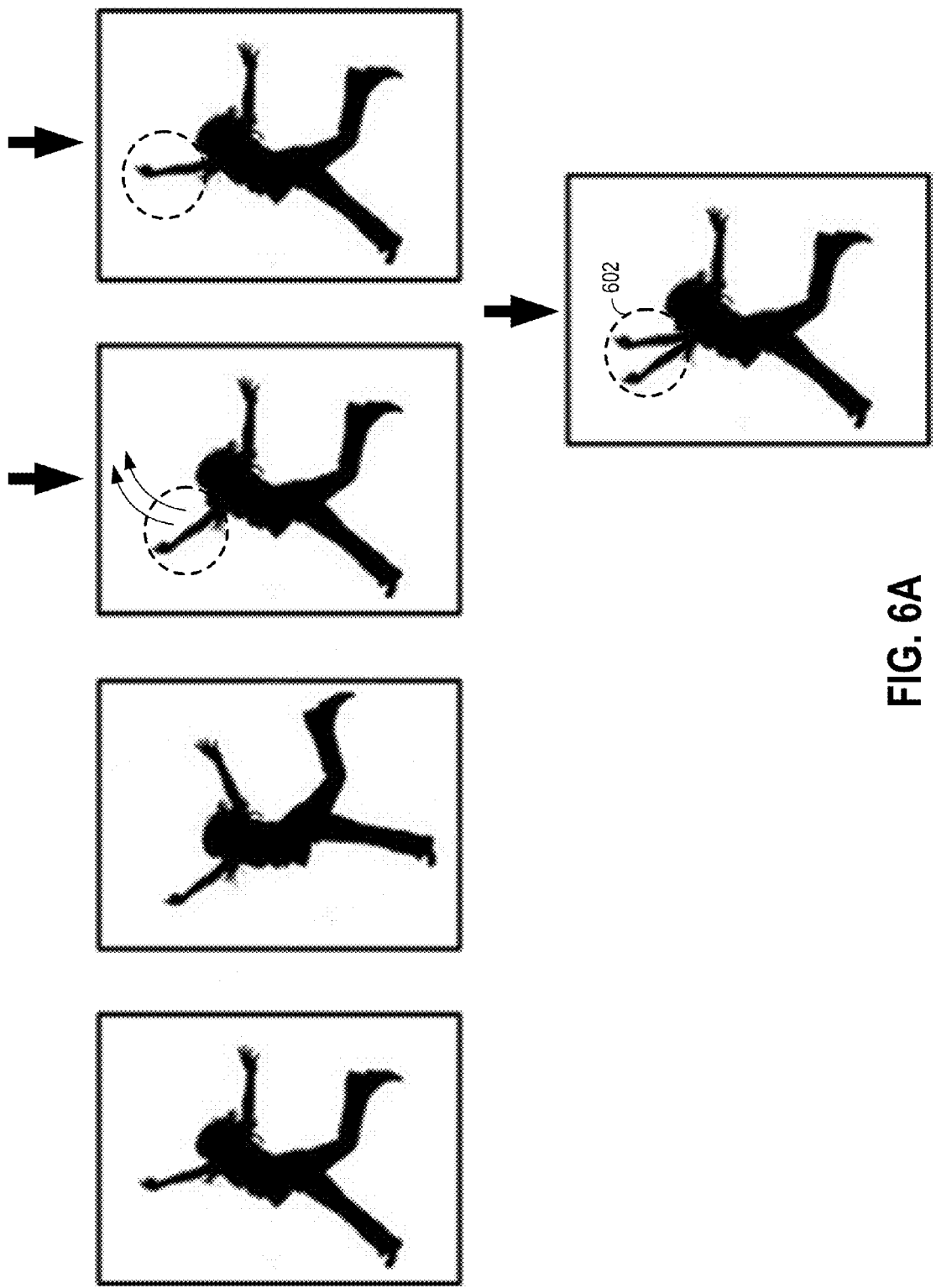
FIG. 6A illustrates the use of an image-capturing window by the content analyzer in the image capture component of FIG. 1 for purposes of identifying candidate images in accordance with various embodiments.

FIG. 6A illustrates the use of an image-capturing window 602 by the content analyzer 114 (FIG. 1) in the image capture component 112 (FIG. 1) for purposes of generating a trigger signal based on an image-capturing template generated from the images of FIG. 5A, and for identifying candidate images in accordance with various embodiments. In the example shown in FIG. 6A, an initial image-capturing window 602 is determined by analyzing the poses depicted in one or more of the digital images (e.g., the $3^{rd}$ and $4^{th}$ digital images shown) associated with a particular image-capturing template 124 (FIG. 1). This allows the user to specify variations of a general target pose, thereby allowing more candidate images to be captured and stored.

Assume for the example shown that the individual's arm varies by approximately 30 degrees between the $3^{rd}$ and $4^{th}$ digital images associated with the image-capturing template 124. Specifically, the initial image-capturing window 602 specifies how closely poses depicted in images must match the target pose in order to be identified as candidate images. This feature serves to expand the number of candidate images that are identified and presented to the user by not requiring an exact match of poses with those defined in the image-capturing templates 124. The initial image-capturing window 602 may be manually specified and adjusted by the user.

The initial image-capturing window 602 of 30 degrees is provided to the content analyzer 114 (FIG. 1) for purposes of expanding the requirement for being considered a candidate digital image. Based on the 30 degree image-capturing window 602, the content analyzer 114 generates a trigger signal responsive to determining that the input video depicts a pose where the location of the user's arm is anywhere within the image-capturing window 602. In this example, image-capturing window 602 comprises approximately a 30 degree window.

Figure 6B:
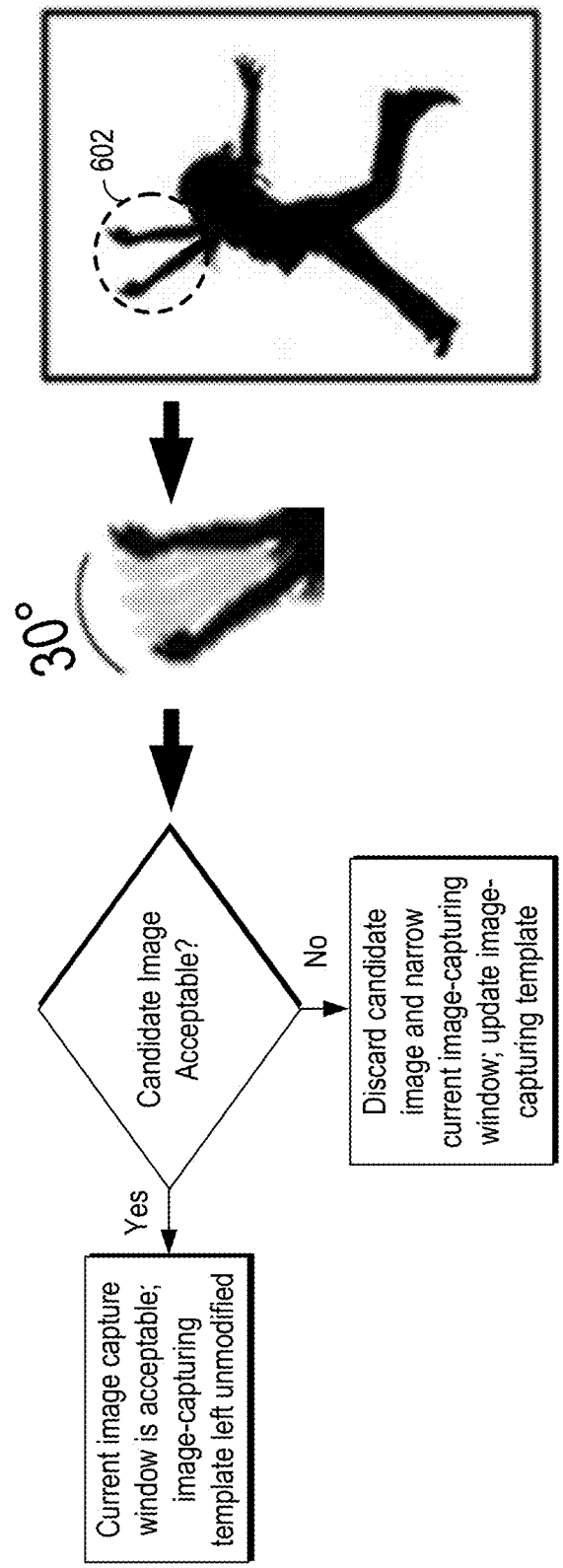
FIG. 6B illustrates how the template adjuster of FIG. 1 adjusts the image-capturing template based on user input regarding candidate images identified using the image-capturing window in accordance with various embodiments.

Reference is made to FIG. 6B, which illustrates how the template adjuster 116 adjusts the image-capturing template based on user input regarding candidate images identified using the image-capturing window 602. As discussed above, an image-capturing window 602 (FIG. 6A) of 30 degrees is established and utilized by the content analyzer 114. Specifically, any image that depicts a pose where the location of an individual's arm is within the image-capturing window 602 is identified as a candidate image and captured.

If the candidate image is acceptable to the user, the current image-capturing window 602 is determined by the template adjuster 116 to be acceptable, and the image-capturing template is left unmodified as the initial image-capturing window 602 is already specified in the image-capturing template. If the candidate image is not acceptable, then the candidate image is discarded and the current image-capturing window 602 is narrowed. For some embodiments, the current image-capturing window 602 may be narrowed by a predetermined amount (e.g., 5 degree increments) or by a predetermined percentage (e.g., 10%). The image-capturing template is then adjusted accordingly to reflect the modified image-capturing window 602.

Figure 6C:
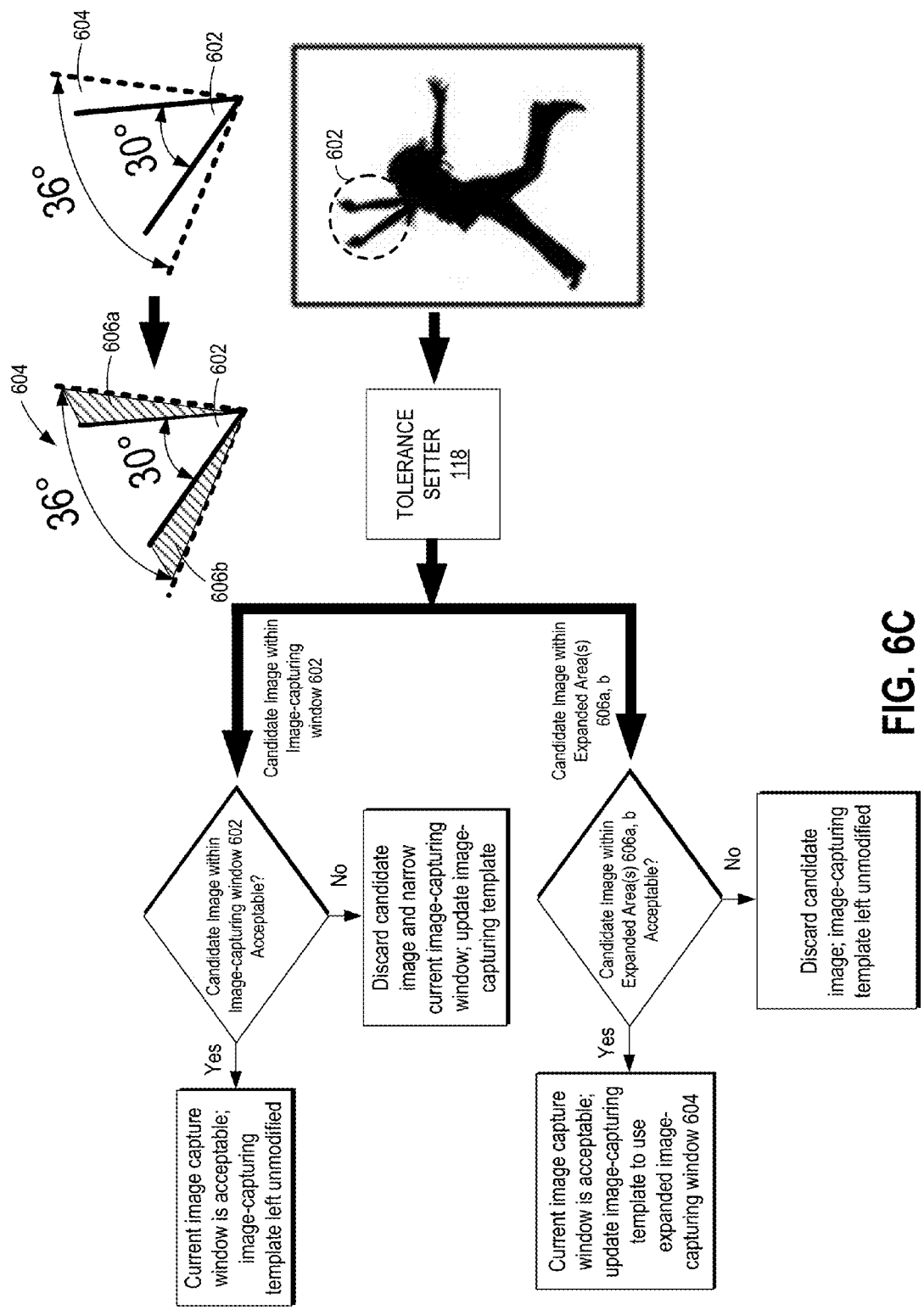
FIG. 6C illustrates expansion of the image-capturing window by the tolerance adjuster in accordance with various embodiments.
Figure 6D:
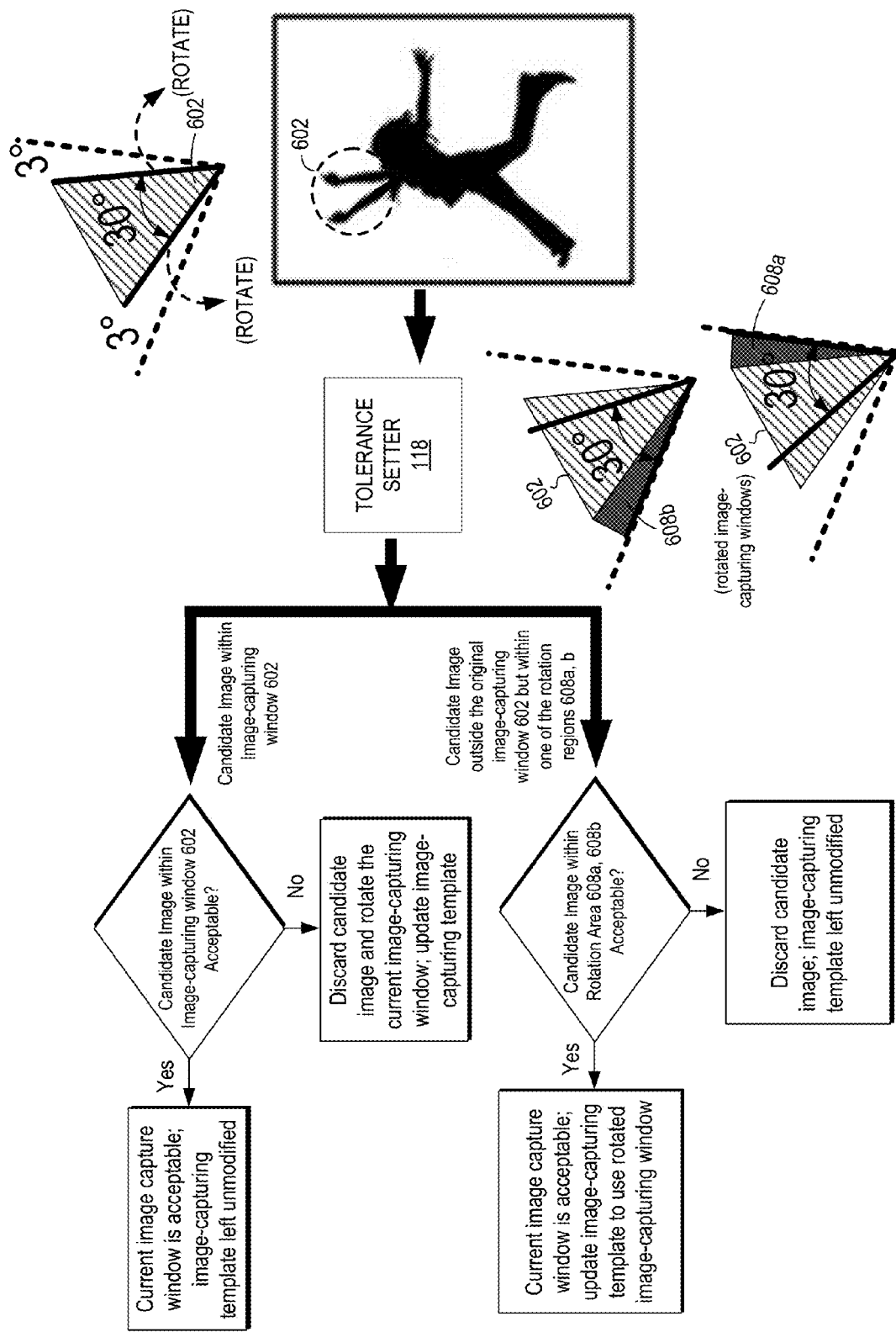
FIG. 6D illustrates rotation of the image-capturing window by the tolerance adjuster in accordance with various embodiments.

FIGS. 6C to 6D illustrate the use of a tolerance setter 118 (FIG. 1) within the template adjuster 116 (FIG. 1) for purposes of expanding the image-capturing window 602 (FIG. 6A) and for adjusting the image-capturing template. Reference is made to FIG. 6C, which illustrates expansion of the image-capturing window 602 by the tolerance setter 118 (FIG. 1) to generate an expanded image-capturing window 604 in accordance with various embodiments. For some embodiments, an expansion parameter is incorporated for purposes of setting a tolerance value associated with the image-capturing window. In particular, the expansion parameter is utilized to further expand the image-capturing window 602 to generate an expanded image-capturing window 604 for purposes of increasing the number of candidate digital images that the user may elect to keep. Referring back to the example in FIG. 6A, suppose that movement of the user's arm spans approximately a 30 degree window across different digital images. As described above, any images depicting poses that fall within the 30 degree image-capturing window are identified as candidate images and automatically captured and stored.

Referring back to FIG. 6C, suppose, for purposes of illustration, that an expansion parameter of 10 percent is utilized. Based on this expansion parameter, the image-capturing window 602 may be expanded by the tolerance setter 118 to generate an expanded image-capturing window 604 of approximately 36 degrees where 3 degrees is added in both directions relative to the arm motion, thereby allowing more digital images to be automatically captured. The image-capturing template is updated to include the expanded image-capturing window 604. A candidate image is then captured while applying the expanded image-capturing window 604. With further reference to FIG. 6C, the regions between the original image-capturing window 602 and the expanded image-capturing window 604 are referred to herein as expanded regions 606a, 606b.

Note that if candidate image accepted by the user is within the original 30 degree image-capturing window 602, then there is no need to update the image-capturing window 602 as the 30 degree image-capturing window 602 is already specified in the image-capturing template. If an accepted candidate image depicts a pose that is outside of the original 30 degree image-capturing window 602 but within the expanded 36 degree image-capturing window 602, then the image-capturing template is updated. That is, if a candidate image depicts a pose that is within one of the expanded regions 606a, 606b and the candidate image is acceptable to the user (i.e., where the user elects to keep the candidate image), then the image-capturing template is updated to utilize the expanded image-capturing window 604.

If a candidate image depicts a pose that is within one of the expanded regions 606a, 606b but is not acceptable to the user (i.e., where the user elects to discard the candidate image), then the image-capturing template is not updated. Thus, if the candidate image is acceptable, the current image-capturing window 602 is determined by the template adjuster 116 (FIG. 1) to be acceptable, and the image-capturing template is updated to utilize the expanded image-capturing window 604 for purposes of identifying additional candidate images. Note that for some embodiments, the tolerance setter 118 may be configured to continue expanding the image-capturing window 602 if the candidate image is acceptable.

If the candidate image is within the 30 degree image-capturing window 602 and is not acceptable, then the current image-capturing window 602 may be narrowed. For some embodiments, the candidate image is discarded and the current image-capturing window 602 may be narrowed by a predetermined amount (e.g., 5 degree increments) or by a predetermined percentage (e.g., 10%). The image-capturing template is updated accordingly. On the other hand, if a candidate image depicts a pose that falls within one of the expanded regions 606a, 606b and is the candidate image is discarded, then the image-capturing template is not adjusted to include the expanded image-capturing window 602 since the user elected to discard the candidate image.

Note that the expansion window may be used to not only expand the image-capturing window but to also tilt or reposition the image-capturing window (e.g., via rotation). With reference back to FIG. 6C, it should be emphasized that the algorithm described above for expanding the image-capturing window 602 may also be utilized for rotating the image-capturing window 602 such that the image-capturing window 602 is expanded and/or rotated. With regards to rotations, the image-capturing window may be rotated according to user input where the algorithm in FIG. 6C differs from the algorithm depicted in FIG. 6D. For example, if a first candidate image within expanded region 606b is accepted by the user, the image-capturing window will be expanded, thereby resulting in an updated image-capturing window that spans both the current image-capturing window 602 and the expanded region 606b. If a second candidate image is then captured within the (newly) updated image-capturing window but discarded by the user, the updated image-capturing window is narrowed according to the upper flow route. By repeating the above two steps, the image-capturing window will keep rotating in the counter-clockwise direction.

The primary distinction between the rotating operations performed by the algorithms of FIGS. 6C and 6D is that with the algorithm in FIG. 6D, the size of the image-capturing window 602 is not expanded or narrowed and remains constant. Instead, the image-capturing window 602 is rotated at different angles by the tolerance setter 118 based on a predetermined angle or based on user input. To further illustrate, suppose that the image-capturing window 602 spans 30 degrees and that an angle of 3 degrees is utilized by the tolerance setter 118 for rotating the image-capturing window 602. With reference to FIG. 6D, rotation of the image-capturing window 602 in the clockwise direction by 3 degrees results in a first rotated region 608a, which is outside the original image-capturing window 602 (shown as the dark region in FIG. 6D). Similarly, rotation of the image-capturing window 602 in the counter-clockwise direction by 3 degrees results in a second rotated region 608b.

If a candidate image is within the image-capturing window 602 (prior to rotation), then a determination is made by the user on whether the candidate image is acceptable. If the candidate image is not acceptable, the candidate image is discarded, and the image-capturing window 602 is rotated in either the clockwise or counter-clockwise direction. For some embodiments, the direction of rotation is determined based on the location of the user's arm. Specifically, if the location of the user's arm is closer to the left border of the image-capturing window 602, then the tolerance setter 118 will rotate the image-capturing window 602 in the opposite direction (i.e., towards the right in the clockwise direction). This is based on the assumption that candidate images where the location of the user's arm is closer to the left border are more likely to be discarded. If the location of the user's arm is exactly in the middle of the image-capturing window 602, the tolerance setter 118 may be configured to automatically rotate the image-capturing window 602 in either direction.

With further reference to FIG. 6D, if a candidate image depicts a pose where the location of the user's arm is outside the image-capturing window 602 (prior to rotation) but within one of the rotation regions 608a, 608b, then a determination is made by the user on whether the candidate image is acceptable. If the candidate image is not acceptable, then the candidate image is discarded, and the image-capturing template is left unmodified. If the candidate image is acceptable to the user, the image-capturing template to utilize the rotated image-capturing window 602. Again, the image-capturing window 602 is rotated but remains the same size (e.g., 30 degrees).

Note that although the examples shown in FIGS. 6C and 6D show the expansion and rotation of the image-capturing window 602 as separate operations, the tolerance setter 118 may also be configured to perform a combination of these operations for purposes of identifying additional candidate images. It should also be emphasized that while the examples in FIGS. 6A to 6D focus on the individual's arm, the concepts described above for the image-capturing window 602 may be applied to other parts of the individual (e.g., leg(s)) and that the general pose/outline of individuals is analyzed as a whole. Furthermore, multiple image-capturing windows 602 may be utilized at the same time.

Figure 7:
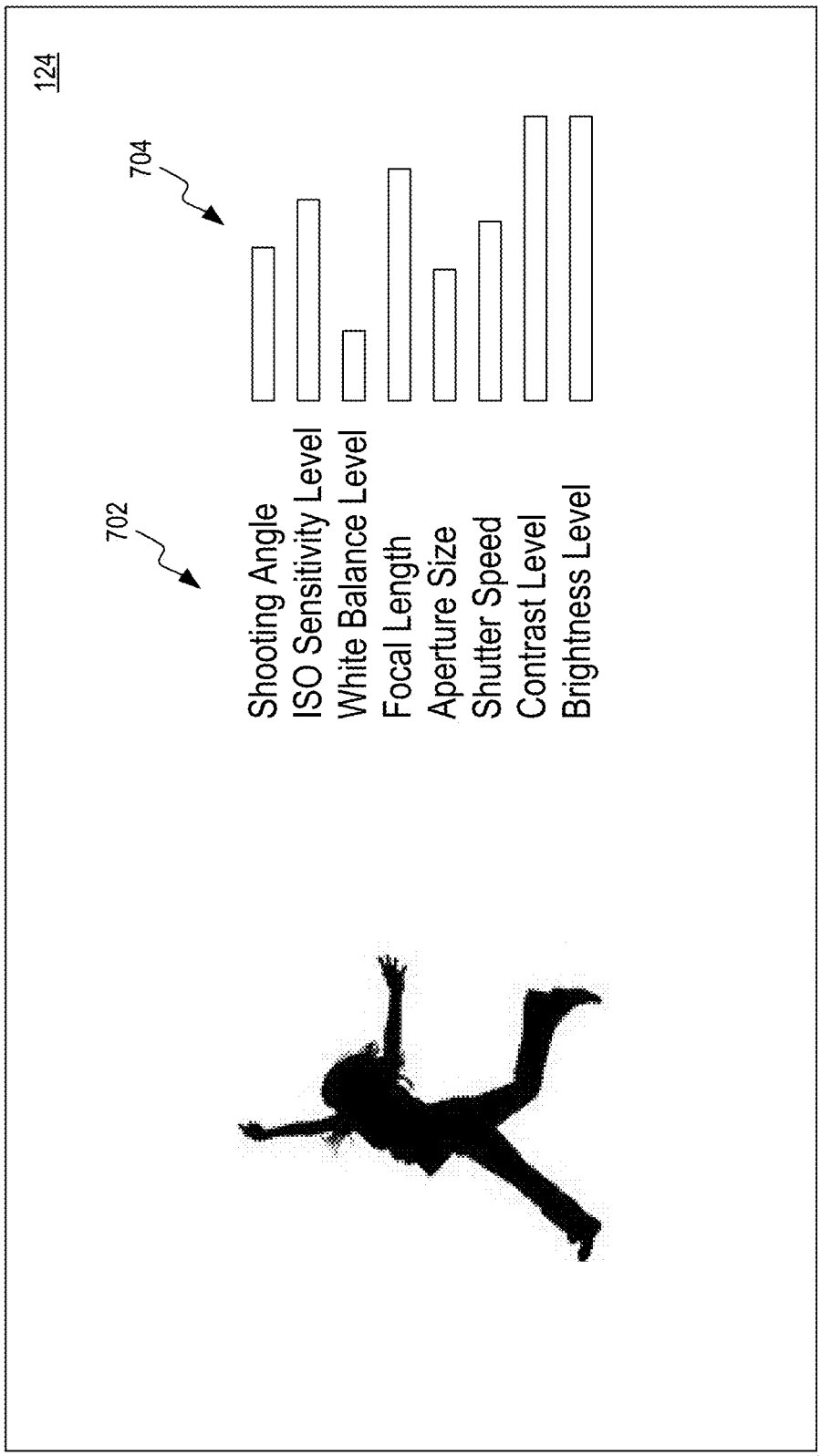
FIG. 7 illustrates an image-capturing template that defines a plurality of operational settings of the camera module in FIG. 1 for automatically capturing and storing digital images according to various embodiments of the present disclosure.

In addition to specifying a target pose, the image-capturing template may also specify other parameters associated with capturing and storing candidate images. Reference is made to FIG. 7, which illustrates an image-capturing template 124 that defines a plurality of operational settings and characteristic values 702 of the camera module 128 (FIG. 1) for capturing and storing digital images. In the context of this disclosure, operational settings generally refer to parameters applied by the camera module 128 (FIG. 1) for capturing candidate images. The operational settings may comprise parameters specified by the user and/or parameters set by default by the digital recording device 102 (FIG. 1) For example, operational settings may include but are not limited to the shooting angle, the sensitivity level of the camera module 128 (ISO level), the shutter speed, and so on.

Operational settings are to be distinguished from characteristic values, which comprise attributes of candidate images that have been captured by the camera module 128. In some instances, a desired target pose specified by the user may be associated with an individual in action. In this regard, the user may manually optimize the operational settings of the camera module 128 to ensure that high quality photos are captured. Thus, for some embodiments, the template adjuster 116 may be configured to record the operational settings and characteristic values 702 associated with candidate images that the user tends to keep rather than delete.

For some embodiments, template adjuster 116 (FIG. 1) may be configured to allow the user to adjust the operational settings in order to specify a particular shooting style. Suppose for example, that the camera module is configured to apply an initial set of operational settings previously specified in a given image-capturing template, and the image through the view finder is blurry or out of focus. The template adjuster may be configured to allow the user to adjust one or more of the operational settings in order to enhance the image-capturing process. Thus, the template adjuster allows the user to adjust the shooting style by changing one or more operational settings (e.g., shutter speed, aperture size) and not characteristic values (e.g., brightness level, contrast level) prior to images being captured by the camera module 128. Note that described above, characteristic values comprise attributes of images captured by the camera module 128.

In the example of FIG. 7, the operational settings and characteristic values 702 of the camera module 128 may include, but is not limited to, shutter speed, aperture size, focal length, ISO sensitivity, and camera shooting angle. For some embodiments, where each of the operational settings and characteristic values 702 may be assigned corresponding weight values 704. In the example shown, the contrast level and the brightness level are more heavily weighted, which may indicate that a large number of candidate images that the user elected to keep share a common or similar contrast level and bright level. That is, the weight adjuster 120 may determine that the user tends to favor a particular contrast level and a particular brightness level in capturing images. Thus, the next time the user sets the camera to the same or similar contrast level and brightness level, the content analyzer 114 will determine that there is an increased likelihood that a target pose will soon appear in the input video.

Figure 8:
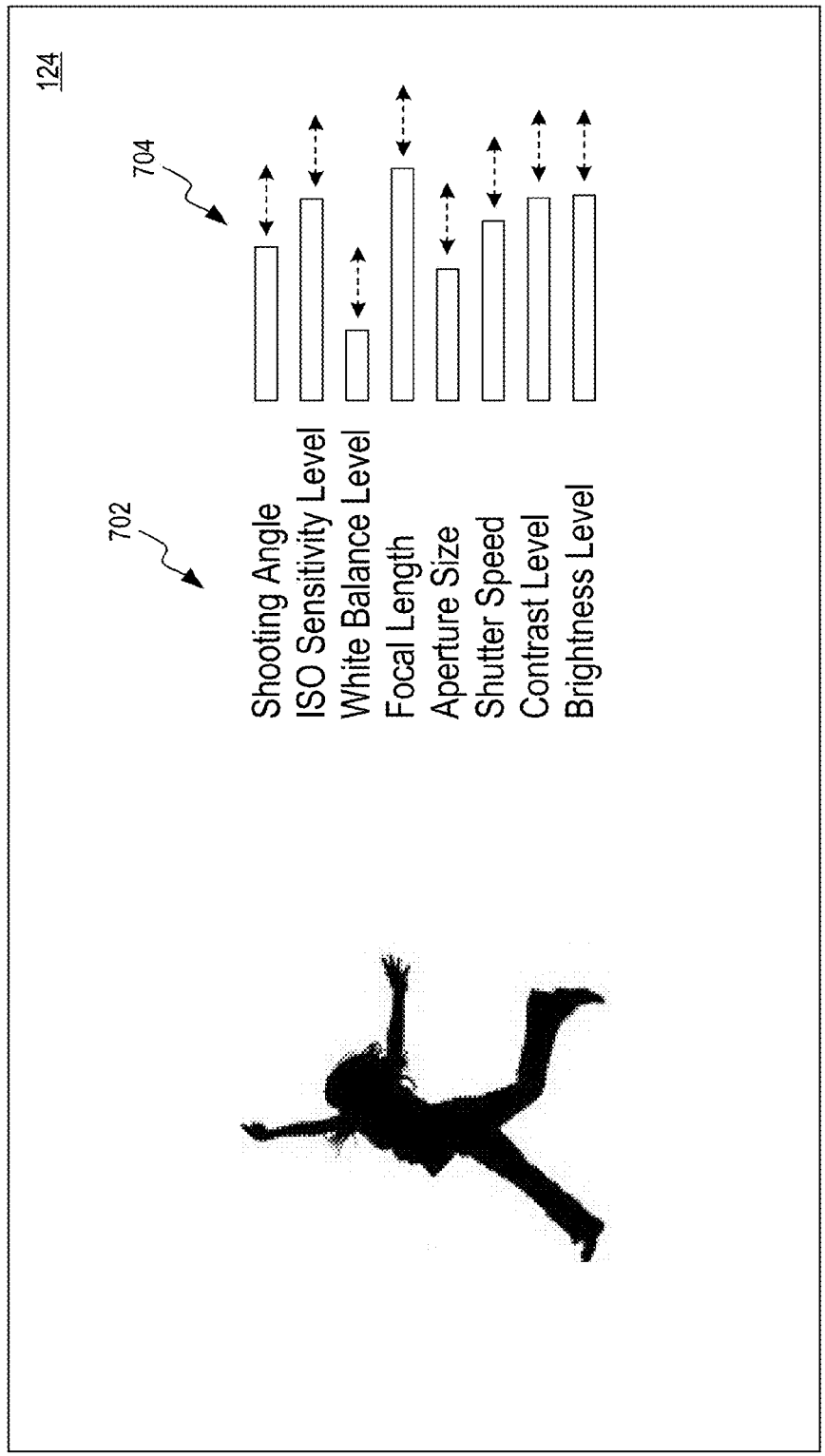
FIG. 8 illustrates how the weight adjuster in the template adjuster is configured to dynamically adjust the corresponding weight values of each of the operational settings of the camera module according to various embodiments of the present disclosure.

With reference to FIG. 8, for some embodiments, the weight adjuster 120 in the template adjuster 116 is configured to dynamically adjust the corresponding weight values 704 of each of the operational settings 702 of the camera module 128. Suppose, for example, that the weight adjuster 120 determines that the more recent digital images that the user has elected to keep share a common white balance level, the weight adjuster 120 will then increase the corresponding weight value 704 of that operational setting 702.

Figure 9:
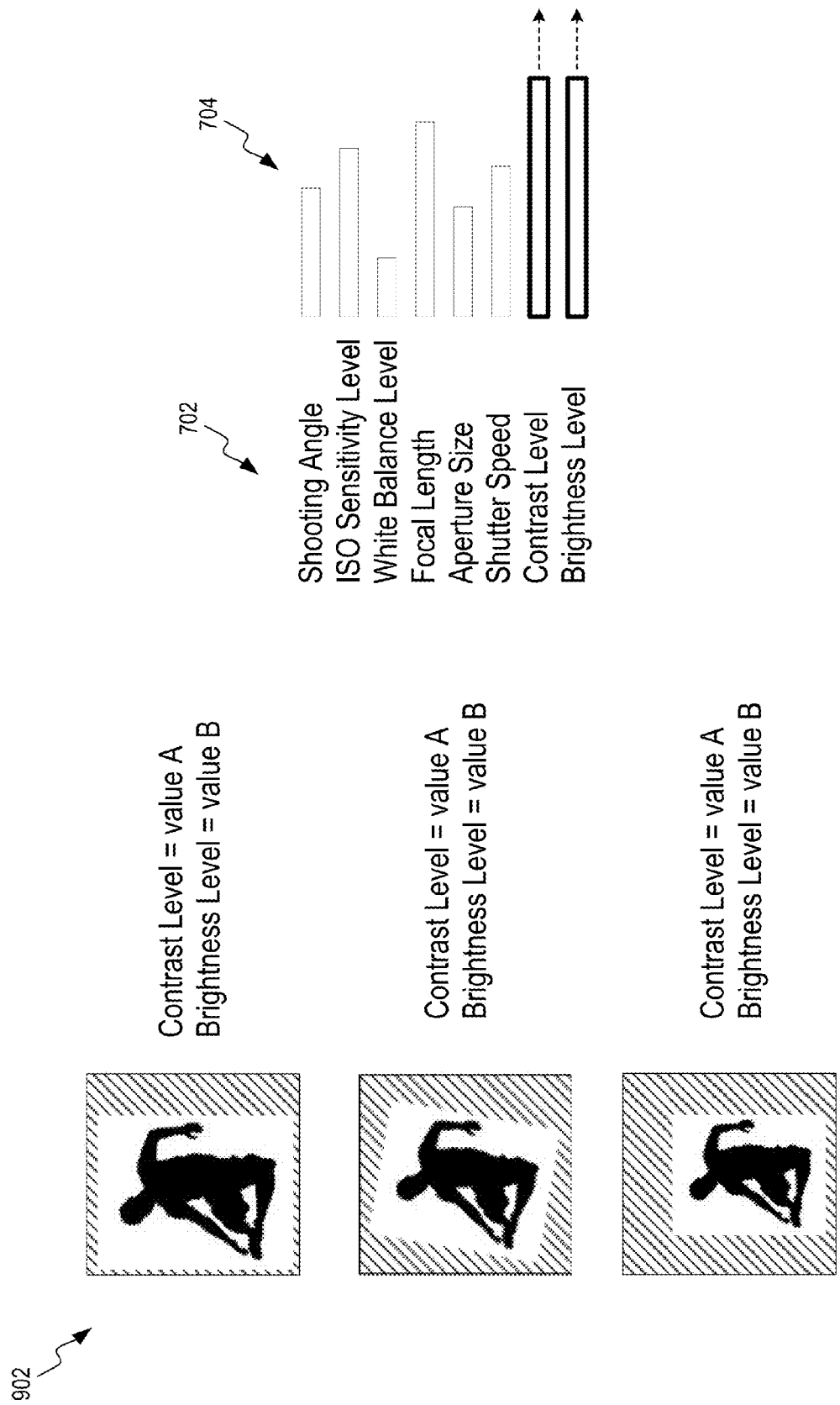
FIG. 9 illustrates how the weight adjuster increases the weight values of certain operational parameters based on candidate images that the user has elected to keep according to various embodiments of the present disclosure.

To further illustrate, reference is made to FIG. 9, which illustrates how the weight adjuster 120 (FIG. 1) increases the weight values of certain operational parameters based on candidate images that the user has elected to keep. In the example shown, the user has elected to keep a series of candidate images 902 that depicted the desired pose. The weight adjuster 120 determines that the candidate images 902 all share common contrast level and brightness level settings. Based on this, the weight adjuster 120 increases the weight values associated with these operational settings such that the content analyzer 114 (FIG. 1) will know that the next time the user configures the camera module 128 to operate with the same or similar contrast level and brightness level settings, there is an increased likelihood that the desired pose will be depicted in the input video.

For some embodiments, the weight adjuster 120 may determine the operational settings associated with the input video by extracting metadata embodied as EXIF (exchangeable image file format) information embedded in the input video, where the EXIF format is a standard that specifies the formats for media content used by digital recording devices 102. In this regard, the image capture component 112 (FIG. 1) adaptively learns the user's preference for desired photo shooting parameters and adjusts the image-capturing template accordingly.

As described above, the template adjuster 116 dynamically adjusts image-capturing templates 124 based on user input. Specifically, the template adjuster 116 adaptively learns the user's preference for digital images and optimizes the image-capturing template to more accurately identify and capture candidate images, which are then presented to the user. The user either deletes or keeps the candidate images. Because the template is adjusted according to whether the user keeps or deletes the captured images, there may be instances where the digital image contains the desired target pose but where the user nevertheless discards the digital image due to blurring or other undesired artifact being present in the digital image, thereby affecting the template adjusting process.

Figure 10:
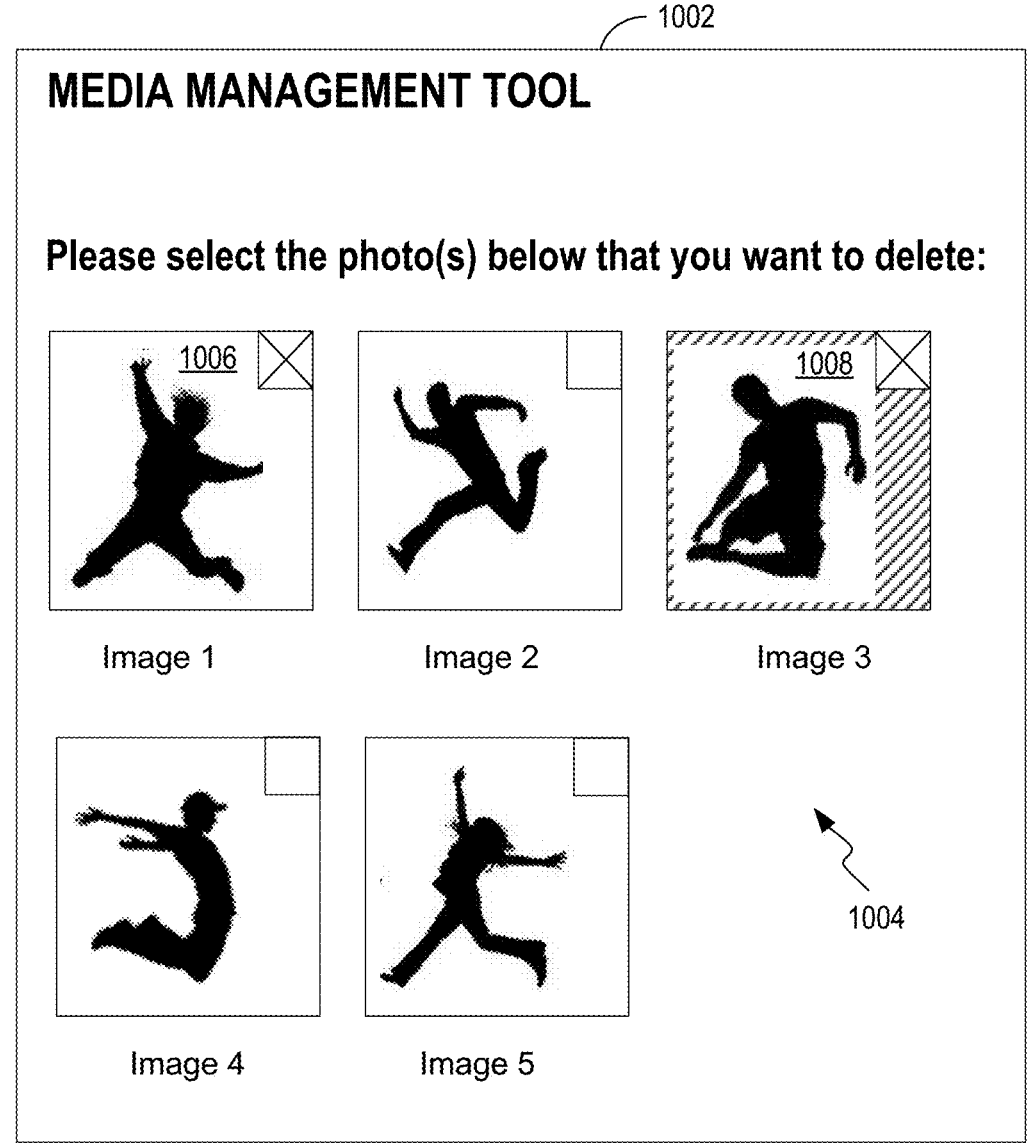
FIG. 10 illustrates an example user interface generated by the user interface component and displayed to the user for determining the user's reason for deleting candidate images according to various embodiments of the present disclosure.

Reference is made to FIG. 10, which illustrates an example user interface 1002 generated by the user interface component 130 (FIG. 1) and displayed to the user for determining the user's reason for deleting candidate images. In the example shown, the content analyzer 114 captures and stores a series of candidate images 1004 that are presented to the user. Using the selection components shown, the user deletes the undesired images 1006, 1008.

Figure 11:
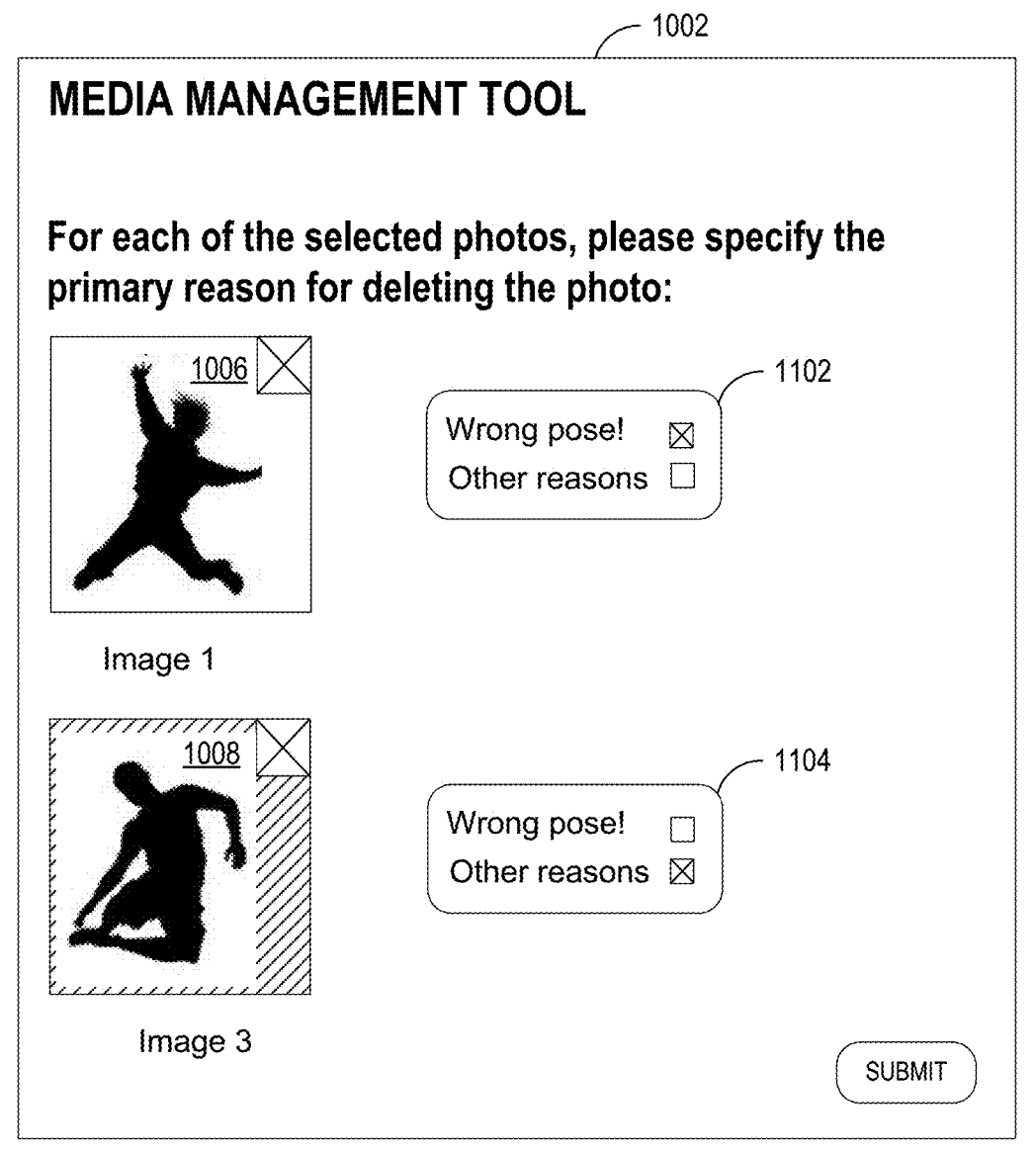

FIG. 11 illustrates the use of graphical control components 1102, 1104 for purposes of determining the user's reason for deleting the undesired images 1006, 1008. In the example shown, dialog boxes prompt the user to specify the primary reason for deleting the candidate images 1006, 1008 in order to determine whether the template adjuster 116 (FIG. 1) should adjust the image-capturing template(s) 124 (FIG. 1). For the first candidate image 1006 to be deleted, the user specifies that the wrong pose is depicted in the candidate image 1006. Based on this information, the template adjuster 116 accordingly adjusts the image-capturing template(s) 124 (FIG. 1) currently being applied by the content analyzer 114 (FIG. 1).

Figure 12:
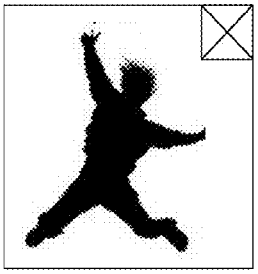
FIG. 12 illustrates how a graphical control component displays additional selection components that allow the user to further specify the reasons for deleting the candidate image according to various embodiments of the present disclosure.

For the second candidate image 1008 being deleted, the user specifies that the user wishes to delete the candidate image 1008 for other reasons. That is, the candidate image 1008 depicts the correct target pose, but the user wishes to delete the candidate image 1008 for other reasons (e.g., poor image quality). In the user interface 1002 shown in FIG. 12, the graphical control component 1104 displays additional selection components that allow the user to further specify the reasons for deleting the candidate image 1008. In the example shown, the user specifies that the candidate image 1008 is being deleted due to poor lighting. If the specified reason corresponds to an operational setting 702 (FIG. 7), the weight adjuster 120 (FIG. 1) will adjust the image-capturing template(s) 124 accordingly. However, if the specified reason does not correspond to any parameter specified in the image-capturing template(s) 124, the template adjuster 116 will refrain from adjusting the image-capturing template 124.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A digital recording system for automatically capturing digital images, comprising:
 a camera module operating in a live preview mode for generating a video stream comprising digital images;
 a memory storing instructions; and
 a processor coupled to the memory and configured by the instructions for performing the steps of:
  generating a trigger signal based on an initial image-capturing template specifying an initial target pose, wherein the camera module automatically captures and stores digital images responsive to receiving the trigger signal;

receiving from a user one or more selections among the stored digital images, wherein the one or more selections correspond to captured digital images to be deleted; and automatically modifying the initial target pose specified by the image-capturing template to generate a modified image-capturing template responsive to receiving the one or more user selections among the stored digital images, wherein the initial target pose is modified based on at least one pose depicted in the captured digital images that are not selected to be deleted, and wherein the processor generates the trigger signal based on the modified image-capturing template.

2. The system of claim 1, wherein the processor generates the trigger signal responsive to the content in the received digital images approximately matching with the at least one target pose specified in the image-capturing template.

3. The system of claim 2, wherein the processor generates the trigger signal responsive to the content in the received digital images matching the at least one target pose specified in the image-capturing template within a predefined tolerance.

4. The system of claim 3, wherein an initial value of the predefined tolerance is specified by the user.

5. The system of claim 3, wherein the processor further comprises a tolerance setter for adaptively adjusting the tolerance value based on the one or more user selections.

6. The system of claim 1, wherein the image-capturing template further defines a plurality of operational settings for configuring the camera module for capturing and storing the digital images.

7. The system of claim 6, wherein the operational settings comprise one or more of: shutter speed, aperture size, focal length, white balance, ISO sensitivity, or camera shooting angle.

8. The system of claim 6, wherein the processor is further configured by the instructions for assigning corresponding weight values to each of the operational settings defined in the image-capturing template.

9. The system of claim 6, wherein the processor adaptively assigns the corresponding weight values based on operational settings of the camera module associated with the one or more user selections.

10. The system of claim 6, wherein the operational settings are applied to the camera module prior to the digital images being captured.

11. The system of claim 1, wherein the image-capturing template further defines a plurality of characteristic values corresponding to attributes of digital images captured by the camera module.

12. The system of claim 11, wherein the characteristic values comprise one or more of: brightness level, contrast level, histogram data, regional sharpness, and object shape analysis.

13. The system of claim 6, wherein the processor assigns relatively lower weight values to operational settings of the camera module associated with the one or more user selections.

14. The system of claim 1, wherein at least one target pose specified by the initial image-capturing template is depicted by a user-defined graphical depiction of an individual.

15. The system of claim 1, wherein at least one target pose specified by the initial image-capturing template is depicted by a representative digital photo selected by the user.

16. The system of claim 1, wherein the initial image-capturing template is generated according to a plurality of images depicting similar poses.

17. A method implemented in a digital recording device for automatically capturing digital images, comprising:

generating, by a camera module operating in a live preview mode, a video stream comprising digital images;

generating, by a content analyzer, a trigger signal based on an initial image-capturing template specifying an initial target pose;

automatically capturing and storing, by the camera module, digital images responsive to receiving the trigger signal;

receiving, by a user interface component, from a user one or more selections among the stored digital images, wherein the one or more selections correspond to captured digital images to be deleted; and automatically modifying, by a template adjuster, the initial target pose specified by the image-capturing template to generate a modified image-capturing template responsive to receiving the one or more user selections among the stored digital images, wherein the initial target pose is modified based on at least one pose depicted in the captured digital images that are not selected to be deleted, and wherein the content analyzer generates the trigger signal based on the modified image-capturing template.

18. The method of claim 17, wherein the content analyzer generates the trigger signal responsive to the content in the received digital images approximately matching the at least one target pose specified in the image-capturing template.

19. The method of claim 18, wherein the content analyzer generates the trigger signal responsive to the content in the received digital images matching the at least one target pose specified in the image-capturing template within a predefined tolerance.

20. A cloud-based image processing system coupled to a digital recording device configured to automatically capture digital images, comprising:

a device interface coupled to a camera module of the digital recording device, the device interface receiving digital images in a video stream generated by the camera module;

a memory storing instructions;

at least one processor coupled to the memory and configured by the instructions for performing the steps of:

generating a trigger signal based on an initial image-capturing template specifying an initial target pose, wherein the at least one processor transmits the trigger signal to the camera module in the digital recording device via the device interface, wherein the camera module in the digital recording device automatically captures and stores digital images in the cloud-based image processing device responsive to receiving the trigger signal;

receiving from a user one or more selections among the stored digital images, wherein the one or more selections correspond to captured digital images to be deleted; and automatically modifying the initial target pose specified by the image-capturing template to generate a modified image-capturing template responsive to receiving the one or more user selections, wherein the initial target pose is modified based on at least one pose depicted in the captured digital images that are not selected to be deleted, and wherein the at least one processor generates the trigger signal based on the modified image-capturing template.

21. The system of claim 20, wherein the at least one processor generates the trigger signal responsive to the content in the received digital images approximately matching the at least one target pose specified in the image-capturing template.

22. The system of claim 21, wherein the at least one processor generates the trigger signal responsive to the content in the received digital images matching the at least one target pose specified in the image-capturing template within a predefined tolerance.

23. The system of claim 22, wherein an initial value of the defined tolerance is specified by the user.

* * * * *